July 16, 1957 G. E. SUDEROW 2,799,238
HATCH COVER
Filed Nov. 17, 1953 8 Sheets-Sheet 1

INVENTOR
George E. Suderow
BY
Alvin Browdy
ATTORNEY

July 16, 1957  G. E. SUDEROW  2,799,238
HATCH COVER
Filed Nov. 17, 1953  8 Sheets-Sheet 2

INVENTOR
George E. Suderow
BY
Alvin Browdy
ATTORNEY

July 16, 1957 G. E. SUDEROW 2,799,238
HATCH COVER
Filed Nov. 17, 1953 8 Sheets-Sheet 3

INVENTOR
George E. Suderow

BY Alvin Browdy
ATTORNEY

July 16, 1957   G. E. SUDEROW   2,799,238
HATCH COVER
Filed Nov. 17, 1953   8 Sheets-Sheet 4

INVENTOR
George E. Suderow
BY
Alvin Browdy
ATTORNEY

July 16, 1957 G. E. SUDEROW 2,799,238
HATCH COVER
Filed Nov. 17, 1953 8 Sheets-Sheet 6

INVENTOR
George E. Suderow
BY
Alvin Browdy
ATTORNEY

July 16, 1957 G. E. SUDEROW 2,799,238
HATCH COVER
Filed Nov. 17, 1953 8 Sheets-Sheet 7

INVENTOR
George E. Suderow

BY Alvin Browdy
ATTORNEY

July 16, 1957  G. E. SUDEROW  2,799,238
HATCH COVER

Filed Nov. 17, 1953  8 Sheets-Sheet 8

INVENTOR
George E. Suderow

BY
Alvin Browdy
ATTORNEY

United States Patent Office 2,799,238
Patented July 16, 1957

2,799,238

HATCH COVER

George E. Suderow, New York, N. Y.

Application November 17, 1953, Serial No. 395,660

8 Claims. (Cl. 114—202)

This invention relates to hatch covers for ships and more particularly to articulated hatch covers which are hinged to the deck at one end, have wheels at the free end and at intermediate points thereof, and are adapted to cover a relatively long hatch opening.

The maintenance of a large ship in port is very costly and the time required for loading and unloading must be reduced to a minimum. In the past, it was customary to close cargo hatches with wood or metal planks covered by tarpaulin. Due to the time and labor required for opening and closing of the hatches using planks and tarpaulin, large modern vessels are being equipped with articulated hatch covers which may be opened and closed in a matter of minutes.

It has heretofore been proposed to utilize a pair of oppositely disposed articulated hatch cover sections hinged at one end to the deck, and provided with wheels at the free ends thereof. Such covers in closed position will bridge the hatchway, and yet, when opened and folded will occupy but little of the deck area. The construction of such hatch covers has provided a number of problems which have not been adequately solved, particularly in water-tight covers for hatches of relatively large length. It has been proposed to use two section covers, each section comprising two pivotally joined panels, whereby each section covers one-half the length of the hatch opening. In the open position, each section folds at the center and is retained in a vertical position. Difficulty is experienced in a cover for a relatively long hatch due to the unwieldy height of the folded section. To solve this problem, it has been proposed to use a plurality of hatch cover sections side-by-side, each section of which is independently handled by rolling that section on its wheels to the end of the hatch whereupon it is turned on end and the sections are vertically stacked at the end of the hatch side-by-side. This type of hatch cover is not as readily handled as the articulated hatch cover heretofore described.

In previously proposed water-tight hatch covers, the arrangement for raising and lowering the hatch cover into sealing position has required manually jacking each wheel downwardly, preferably with a man working at each side of the cover to lower both sides of the cover simultaneously.

It is an object of the present invention to provide an arrangement of water-tight articulated hatch cover that permits the entire cover to be lowered simultaneously into sealed position by a single operation.

It is another object of the present invention to provide an improved construction and arrangement of water-tight articulated hatch cover to enable an extremely long hatch to be readily uncovered and the hatch cover to be folded compactly together when in the open position and stowed clear of the hatchway.

It is a further object of the present invention to provide a waterproof four-panel hatch cover section that can be opened with ease and stored in a vertical position.

It is a still further object of the invention to provide a waterproof hatch cover for an extremely long hatch opening that can be closed with ease and sealed and locked in the closed position to prevent the entrance of water into the hatch.

It is a still further object of the invention to provide a hatch construction with a novel wheel supporting arrangement which retains the hatch cover in the sealed position.

It is a still further object of the invention to provide a waterproof four-panel hatch cover section with a novel wheel arrangement to permit the opening ad closing of the hatch cover with ease.

It is a still further object of the invention to provide a novel link hinge arrangement to form a waterproof intermediate joint of a four-panel hatch cover section.

It is a still further object of the invention to provide improved wheel-supporting arrangements which can be simultaneously lowered to sealed position.

It is a still further object of the invention to provide novel wheel supporting devices which raise and lower the hatch cover from and to sealed position.

It is a still further object of the invention to provide novel dog arrangements for locking the cover to the coaming and at the intermediate joint.

These and other objects are accomplished by the following invention wherein a coaming upstanding from the deck is provided with a flange extending outwardly therefrom to serve as a trackway, a two-sectioned articulated hatch cover, each section of which has four panels hinged together, one end panel of each section being hinged to the deck, and a wheel construction at the other end of the section adapted to travel on the flange, and additional wheel constructions at intermediate points of the section likewise adapted to travel on the cammed tracks, wheel platforms at the proper points on the flange, and means for raising and lowering the platforms thereby raising and lowering the cover to seal the hatch cover to the coaming.

Other objects and the nature and advantages of the instant invention will be apparent from the following description taken in conjunction with the accompanying drawings, wherein:

Fig. 3a is a continuation of Fig. 3;

Figure 1:
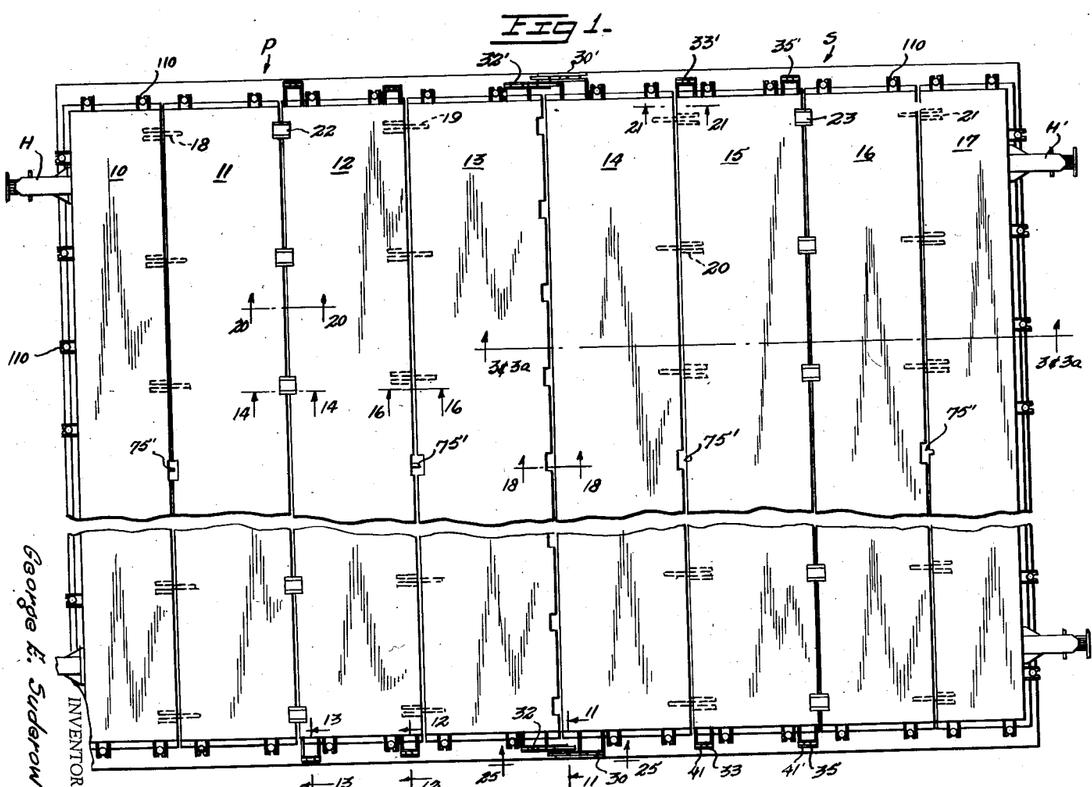
Fig. 1 is a plan view of the hatch shown with the cover in the closed position.

The general arrangement of the hatch when in closed position is shown in Fig. 1. Although the drawings illustrate an eight-panel hatch cover of two sections, it should be understood that the invention may well comprise a hatch cover of two sections, each having an unequal number of panels therein, or a single section cover of four panels, six panels, eight panels or greater. The form of the invention to be described herein is a two-section cover in which each section has four panels, wherein the meeting edge of the two sections is in the middle of the hatchway. The port section of the cover, identified as P, includes the panels 10, 11, 12 and 13, whereas the starboard section of the cover is identified as S and includes the panels 14, 15, 16 and 17. The outer panels 10 and 17 are hinged to the deck by hinges H and H', respectively. Panels 10 and 11 are hinged together by a plurality of hinges 18 permitting the joint to pivot upwardly with the undersides of panels 10 and 11 moving together. Hinge 19 between panels 12 and 13, hinge 20 between panels 14 and 15, and hinge 21 between panels 16 and 17 are of similar construction to hinge 18 and the panels pivot similarly to panels 10 and 11.

Linked hinges 22 between panels 11 and 12, and linked hinges 23 between panels 15 and 16, to be described hereinafter, are of a different construction from the hinges 18, 19, 20 and 21 and pivot downwardly so that the upper surfaces of panels 11 and 12 move toward one another.

Figures 3, 20, 21:
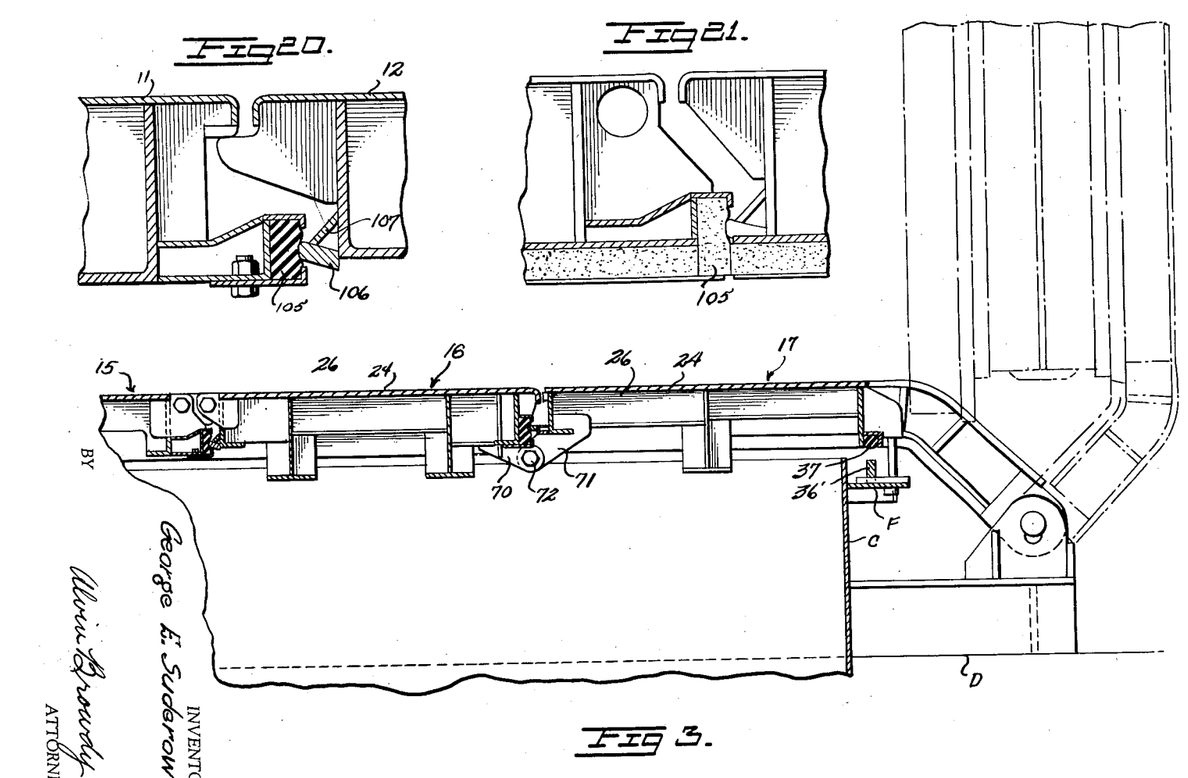
Fig. 3 is a cross-sectional view along the line 3—3 of Fig. 1, showing the cover in the fully open position in dotted lines.
Fig. 20 is a sectional view along the line 20—20 of Fig. 1.
Fig. 21 is a sectional view along the line 21—21 of Fig. 1.
Figure 3:
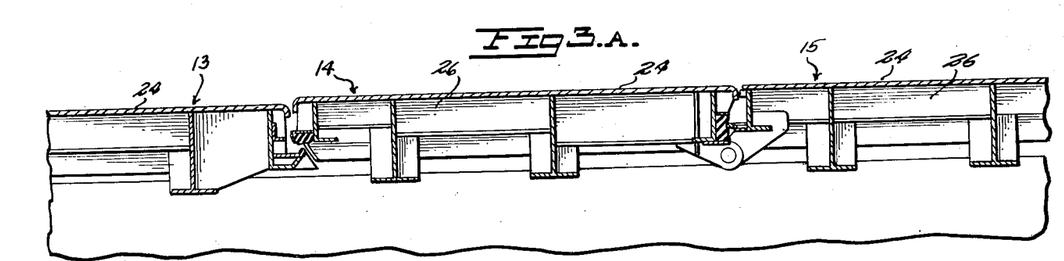

As is illustrated in Figs. 3, 3a, each of the panels is provided with a flat unobstructed upper surface plate 24, a plurality of transverse stiffeners 25 and longitudinal stiffeners 26. The transverse stiffeners 25, which are deeper than the longitudinal stiffeners 26, are so arranged that adjacent panels interfit, with the transverse stiffeners of panels 10, 12, 14 and 16 interfitting between the transverse stiffeners of panels 11, 13, 15 and 17, respectively, so that in the folded position, surface plates 24 may be stowed in a vertical position as shown in dotted lines in Fig. 3.

Since the port and starboard sections are similar in construction, only the starboard section construction will be described in detail.

Figure 11:
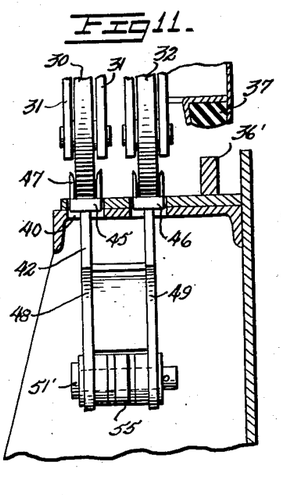
Fig. 11 is a sectional view along the line 11—11 of Fig. 1.

Wheels 30, 30' are provided at the outer sides of the free or inner end of panel 14. The wheels are attached to the underside of the panel as illustrated in Figs. 2a and 11, by means of depending brackets 31 which extend forwardly at the outer end. The wheels 30 are attached near the outer end of the brackets 31. Wheels 32, 32' are similar to wheels 30, 30' provided on panel 13 at the outer sides of the inner end thereof. Wheels 32, 32' are located slightly inwardly from wheels 30, 30', respectively, as may be noted from Fig. 1 and when in the closed position the wheels 30 and 32 overlap one another. A pair of wheels 33, 33' is mounted on the underside of panel 15 at the outer sides of the inner end thereof on depending brackets 34 as per Fig. 2a. Wheels 35, 35' are mounted on brackets 36 depending from panel 15 at the outer sides of the outer end thereof. It should be noted that the wheels 35, 35' are mounted inwardly from the wheels 30, 30' so that the wheels 35, 35' will not interfere with the operation of the wheels 30, 30' upon opening or closing the hatch cover. On the port section P, the wheels corresponding to wheels 35, 35' of the starboard section S are located in alignment with wheels 30, 30' and outwardly from wheels 32, 32' to avoid interference therebetween during operation of the cover.

Figure 4:
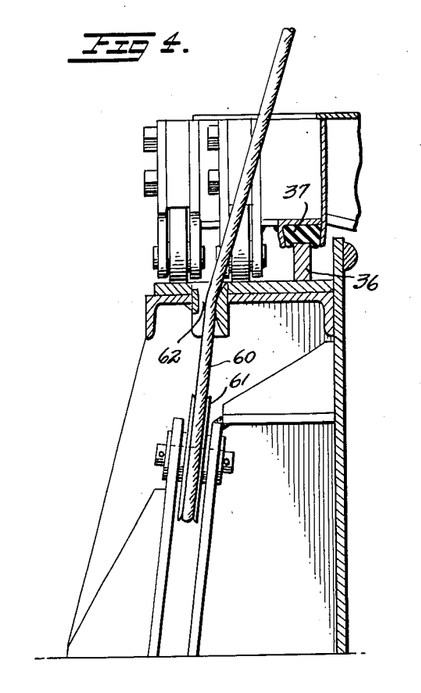
Fig. 4 is a cross-sectional view along the line 4—4 of Fig. 2.
Figure 22:
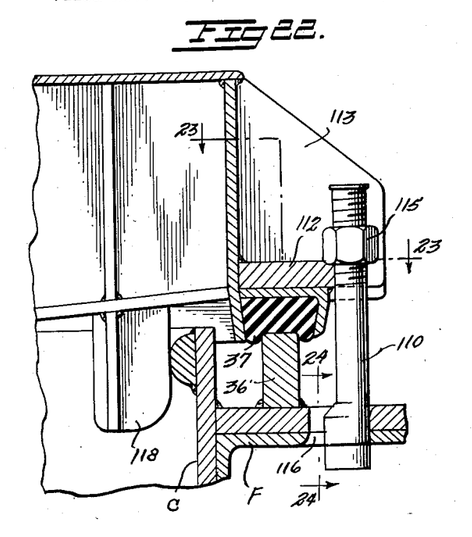
Fig. 22 is a sectional view along the line 22—22 of Fig. 2.

As best shown in Fig. 3, the coaming C extends above the deck D, and is surrounded by a flange F which is attached to the outer surface of the coaming C slightly below the upper surface thereof. A weatherstripping bar 36' extends upwardly from the flange F and completely encircles the hatch opening. On the underside of the hatch covers located inwardly from the wheel brackets is attached a gasket 37 which is adapted to be seated on the weatherstripping bar 36' and form a seal when the cover is lowered into the sealing position shown in Figs. 4, 22 and 26. The outer portion of the flange F on each longitudinal side of the hatch outwardly from the weatherstripping bar 36 serves as a trackway on which the wheels heretofore described are adapted to travel.

At points on the flange F on each longitudinal side of the hatch adjacent the position of the wheels 30, 33 and 35 when in the closed position are located openings 40, 41 and 41'. Fitting into openings 40, 41 and 41' are jacking platforms 42, 43 and 44, best shown in Figs. 2, 2a, 11, 12 and 13.

Platforms 42 are located on each side of the hatch adjacent the meeting edges of the port and starboard sections of the cover and are adapted to receive the wheels 30, 32 and 30', 32'. As shown in Fig. 11, each jacking platform 42 includes two wheel-receiving surfaces 45, 46, each of which is provided with side guides 47. When the jacking platforms are in their upper positions, the wheel receiving surfaces fit into the openings 40 of the flange F and are at the same level as the flange F so that the wheels can travel thereover in moving from the open to the closed position and vice versa. The platforms 42 include a pair of depending members 48, 49 each of which it attached at its upper end to the wheel receiving surfaces 45 and 46. The members 48 and 49 are somewhat triangular in shape, as shown in Fig. 2a, and are pivotally attached at an upper corner to pads 50. The pads 50 are attached to the underside of flange F and are provided with a hole therethrough to accommodate a pin 51 which extends through the pads 50 as well as the members 48 and 49. At a lower corner of members 48 and 49, the platform is pivotally attached to a pull rod 55 which extends substantially the length of the hatch and is pivotally attached to each of the jacking platforms for actuation thereof.

Figure 12:
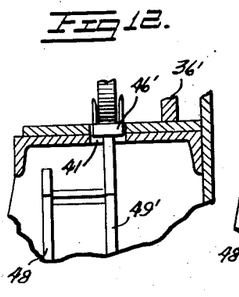
Fig. 12 is a sectional view along the line 12—12 of Fig. 1.
Figure 13:
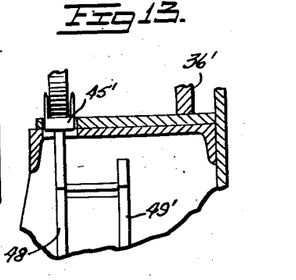
Fig. 13 is a sectional view along the line 13—13 of Fig. 1.

As shown in Fig. 11, pull rod 55 extends between the depending members 48 and 49 and is pivotally attached thereto by means of a pin 51'. The remaining jacking platforms are somewhat similar in construction to platform 42, however, each includes a single wheel-receiving surface 45' or 46' which may be in alignment with the inner wheel-receiving surface 46 of platform 42, as shown in Fig. 12, or the outer wheel-receiving surface 45 of platform 42, as shown in Fig. 13. The platforms 41 and 41' are similar to that illustrated in Fig. 12 with the wheel-receiving surface 46' being mounted on the depending member 49'. Depending member 48' ends somewhat below the flange F. The platform shown in Fig. 13 is for use on the port section P and shows the wheel-receiving surface 45′ being mounted on the depending member 48′, and depending member 49′ ending somewhat below the flange F.

Thus, it will be seen from Fig. 2a that as the pull rod 55 is moved to the left, members 48, 48′, 49, 49′ pivot about pin 51 and the wheel-receiving surfaces 45, 45′, 46, 46′ move downwardly about pins 51 as a pivot point, thereby lowering the wheels which rest thereon into the sealed position.

Figure 2:
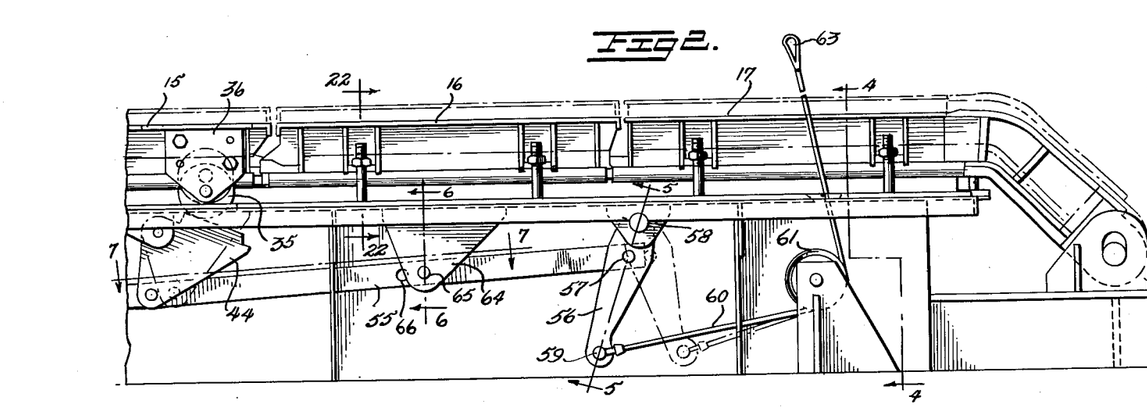
Fig. 2 is a side elevational view of a portion of the cover in the closed and sealed position and showing the cover in the unsealed position in dotted lines.
Figure 2A:
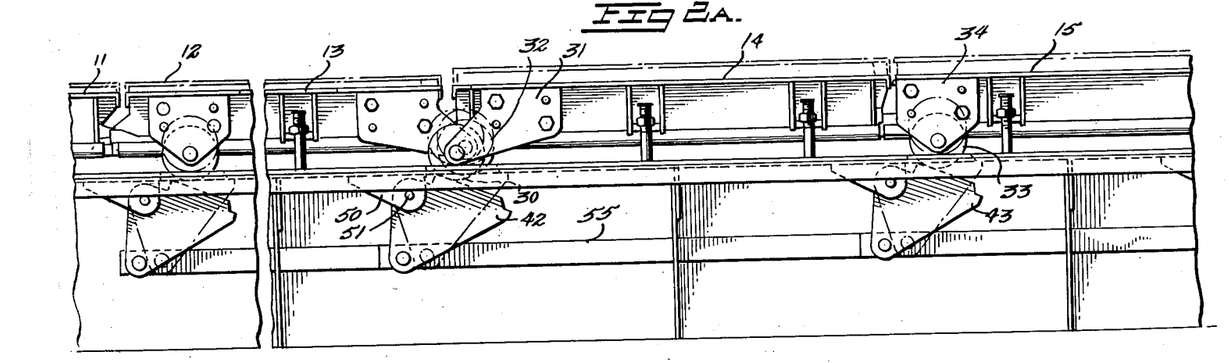
Fig. 2a is a continuation of Fig. 2.
Figure 5:
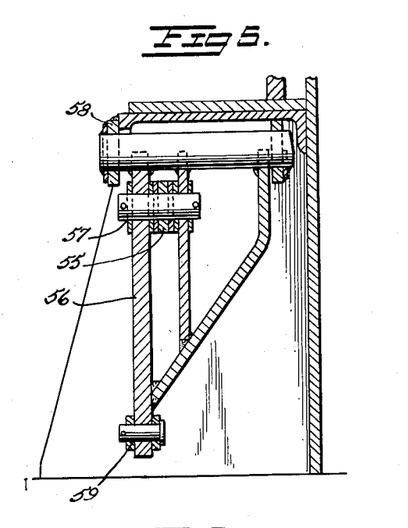
Fig. 5 is a cross-sectional view along the line 5—5 of Fig. 2.

Actuation of the pull rod 55 is accomplished by means of a jacking lever 56 that is pivotally atached at an intermediate point 57 thereon to the end of the pull rod 55, as best shown in Figs. 2 and 5. The upper end of the jacking lever 56 is pivotally connected to a bracket 58 which depends from the flange F. The lower end of the jacking lever 56 is attached at 59 to a cable 60 which thence passes about a sheave 61, thence through an opening 62 in the flange F (Fig. 4) and ending in a loop 63 which is adapted to be connected to a hook on a cable which may be connected to a winch for actuation thereof.

It should be noted that a similar pull rod and jacking lever are provided on both sides of the hatch for raising and lowering the wheels on each side thereof. The cables attached to the jacking levers on each side of the hatch can be brought together near the center of the hatch at one end thereof and both cables can be actuated by a single pull on both cables simultaneously. This results in the simultaneous lowering and raising of all the wheels on both sides of the cover at one time. Thus, it is apparent that by actuating a single cable, all the wheels on one side of the hatch cover can be lowered or raised simultaneously. This is a distinct improvement over the jacking devices heretofore proposed wherein each wheel on each side of the hatch is lowered or raised individually and manually. By a single pull on the two cables, the seal can be broken simultaneously on both sides of the cover.

Figure 6:
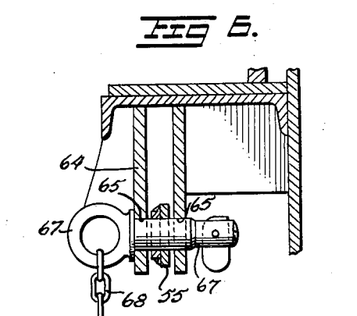
Fig. 6 is a cross-sectional view along the line 6—6 of Fig. 2.
Figure 7:
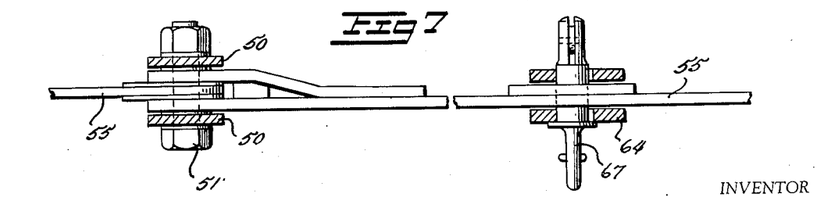
Fig. 7 is a cross-sectional view along the line 7—7 of Fig. 2.
Figure 8:
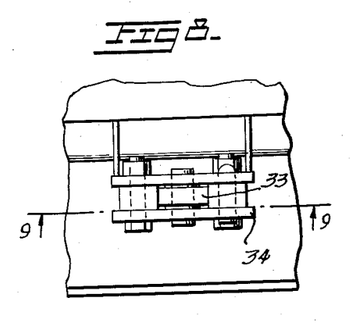
Fig. 8 is a fragmentary top plan view of one of the single wheels and the wheel platform therefor.
Figure 9:
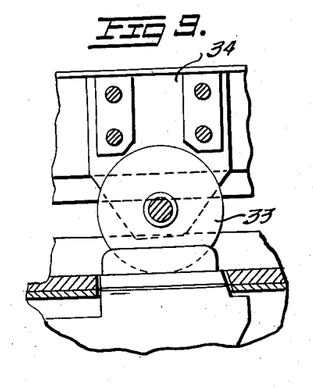
Fig. 9 is a sectional view along the line 9—9 of Fig. 8.
Figure 10:
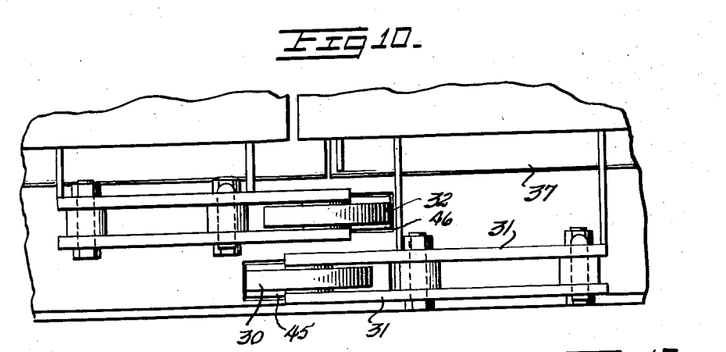
Fig. 10 is a fragmentary top plan view showing the double wheel assembly and the wheel platform therefor.

Between the jacking lever 56 and the last jacking platform 44 is located a pair of depending brackets 64 on the lower surface of the flange F having aligned openings 65 through the brackets 64 adjacent their lower ends. The pull rod 55 passes between the brackets 64, and when an opening 66 in the pull rod 55 is aligned with the openings 65 in the brackets, a toggle pin 67 may be inserted through the aligned openings to lock the pull rod 55 in position, as shown in Figs. 6 and 7. The toggle pin 67 may be provided with a chain 68 to retain it when not in use.

When the wheels of the hatch cover are resting on the wheel-receiving surfaces, the weight of the hatch cover tends to force the jacking platforms downwardly. To bring the jacking platforms into their upper position flush with the track, the cable 60 is pulled upwardly thereby forcing the jacking lever 56 to pivot to the dotted line position of Fig. 2. The pull rod 55 is thus forced to the right causing each of the triangular depending members to pivot upwardly, thereby bringing the wheel-receiving surfaces flush with the track. In this position, the opening 66 in the pull rod and the openings 65 in the brackets 64 are in alignment and the toggle pin 67 can be inserted to lock the pull rod and the jacking platforms in position with the wheel-receiving surfaces flush with the track. After the hatch cover has been moved to closed position with the wheels resting on the jacking platforms, the toggle pin 67 can be removed and the cable 60 released thereby permitting movement of the pull rod to the left by the weight of the hatch cover with each jacking platform moving downwardly about its pivot point. In this position, the gasket 37 is in contact with the weatherstripping bar 36′ and a tight seal is obtained circumferentially of the hatch. By pulling the cable 60 upwardly again, the seal is broken by the rising jacking platforms forcing the hatch cover upwardly breaking the seal between the gasket and the weatherstripping bar.

Figure 16:
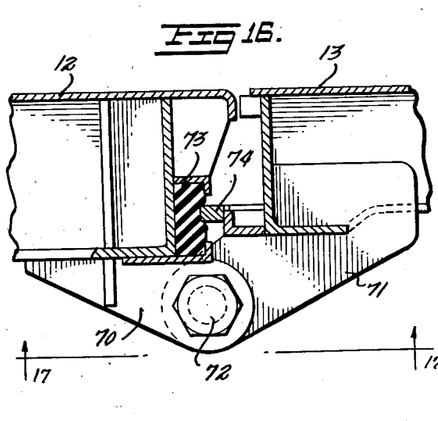
Fig. 16 is a sectional view along the line 16—16 of Fig. 1.
Figure 17:
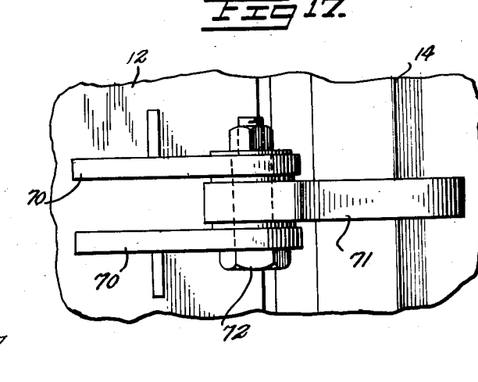
Fig. 17 is a bottom plan view of the intermediate hinge shown in Fig. 16.

The intermediate hinges 18, 19, 20 and 21, best shown in Figs. 16 and 17, are mounted on the normal underside of adjacent panels. Thus, when the sections are in closed position, the hinges are not visible from above. Each hinge includes a pair of spaced pads 70 attached to the underside of one panel and a hinge blade 71 attached to the underside of the adjoining panel. The hinge blade 71 fits between the spaced pads 70 and a hole through the hinge blade 71 is in alignment with holes through the spaced pads 70. A hinge pin 72 extends through the aligned holes permitting pivotal movement between the pads and the blade.

At the joints between the panels 10 and 11, 12 and 13, 14 and 15, and 16 and 17 is mounted a gasket 73 extending across the width of the hatch. As shown in Fig. 16, the gasket 73 is mounted on panel 12 below the top surface thereof, and is adapted to be contacted by a bar 74 attached to the adjoining panel 13 when the panels are in closed position to form a seal across the joint. Fig. 21 shows the meeting edge of the gasket 73 which extends across the intermediate joint and the gasket 37 that extends about the circumference of the hatch cover on the underside thereof.

A lifting pad 75′ is located at the center line of the meeting edges of panels 10 and 11, 12 and 13, 14 and 15, and 16 and 17. An eyelet extends through the lifting pad and shackles at the end of falls may be secured to the lifting pads in the usual manner for raising the sections and buckling at the pivotal joints of the panels.

A seal construction is provided at the meeting edges of the panels 13 and 14 at the center of the hatchway. In the structure shown in Figs. 18 and 19, a weatherstrip 90 is mounted on panel 13 and a cooperating resilient gasket 91 is mounted on the adjacent panel 14. A reinforcing transverse plate 92 is provided and is mounted beneath the upper surface plate 24 of panel 13 near the free edge thereof. The weatherstrip 90 is secured, as by welding, to plate 92. It will be noted that the weatherstrip 90 is positioned slightly beyond the centerline of the ship on the starboard side thereof when the cover is in the closed position, as in Fig. 18. Also, the level of the weatherstrip is considerably lower, in this position, than that of the upper surface plate 24. It will be further noted that neither the upper surface plate of the panel 13 nor that of panel 14 extends quite to the centerline of the ship, and that a narrow gap remains between the plates when the hatch is closed. A reinforcing transverse angle 93 is provided beneath the upper surface plate of panel 14 near the edge of the panel. Secured to the angle 93 is a structure 94 formed of a flat horizontal strip bent downwardly and inwardly at its extremity, so that the angle between the bent portion of structure 94 and the horizontal portion is less than 90°. This structure provides a channel which extends from side to side of the panel 14, near its free end, the base of the channel being wider than the mouth thereof, and within the channel is the resilient gasket 91, mentioned above. Beneath the flange of angle 93 is another strip 95 which is secured to the angle by means of bolts 96 and nuts 97. This strip, as seen in Fig. 18, extends slightly beneath part of the gasket 91, and is employed as a clamp to prevent escape of the gasket.

Figure 18:
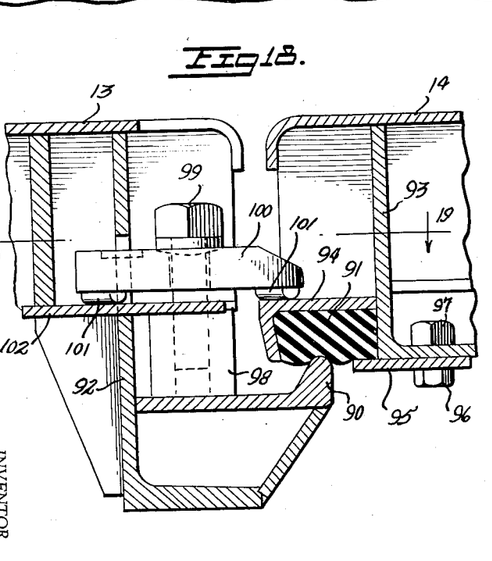
Fig. 18 is a sectional view along the line 18—18 of Fig. 1.
Figure 19:
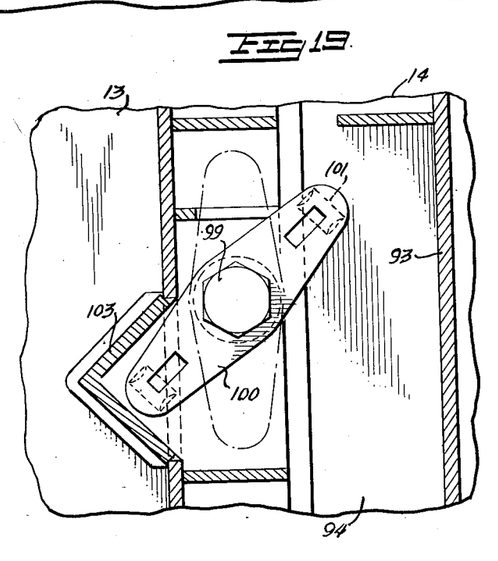
Fig. 19 is a sectional view along the line 19—19 of Fig. 18.

When the cover sections are in the fully closed position, as illustrated in Figs. 18 and 19, the gasket 91 rests upon the transverse weatherstrip 90, the gasket being slightly deformed by pressure derived from the weight of the section, as shown, and thereby a watertight seal is provided across the middle of the hatchway.

It will be seen in Fig. 18 that the panel 13 cannot be moved until the panel 14 has been moved a slight distance upwardly therefrom in order to disengage the gasket 91 from the weatherstrip 90.

Referring to Figs. 18 and 19, there is shown a clamping arrangement for holding the panels 13 and 14 in the sealed position. A boss 98 is mounted upon the extension to the weatherstrip 90 and has threaded into it a bolt 99. This bolt projects through a dog 100 which, when the bolt 99 is sufficiently unscrewed from the boss 98, permits the dog to be turned either into a clamping position, as shown by the full line positions of Fig. 18 and 19, or moved into the open position shown by the dotted lines in Fig. 19. On each end of the dog 100 on the underside thereof is a substantially semispherical member 101 which permits the ready movement of the dog 100 along the surfaces 94 and 102. As shown in Fig. 19, the transverse plate 92 is deformed as indicated at 103, so as to accommodate one end of the dog 100 when the dog is in clamping position.

Figure 25:
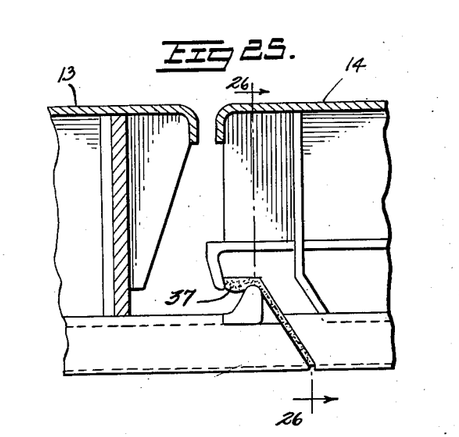
Fig. 25 is a sectional view along the line 25—25 of Fig. 1.
Figure 26:
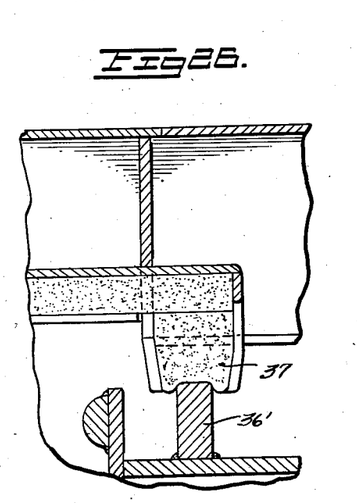
Fig. 26 is a sectional view along the line 26—26 of Fig. 25.

Figs. 25 and 26 show the meeting edge of the gasket 91 which extends across the panel at the meeting edge and the gasket 37 that extends about the circumference of the hatch cover on the underside thereof.

Figure 23:
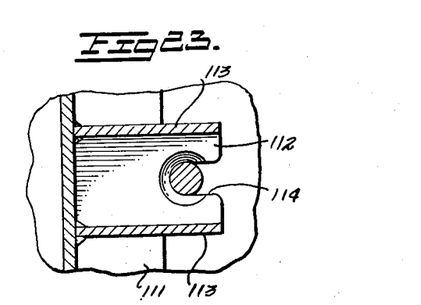
Fig. 23 is a sectional view along the line 23—23 of Fig. 22.

At suitable intervals about the periphery of the hatch are located locking dogs 110 which are adapted to lock the hatch cover in the sealed position with the circumferential gasket 37 in engagement with the weatherstripping bar 36'. A flange 111 extends outwardly from the hatch cover around the circumference thereof, and the gasket 37 is mounted on the underside thereof. At intervals along the flange 111 corresponding to the location of the dogs 110 are located dog pads 112 supported by brackets 113. Dog pads 112 are cut away as shown at 114 in Fig. 23 to receive the dogs 110. The dogs 110 are threaded at their upper ends to receive a bolt 115 which is larger than the cut-away portions 114 of the dog pads. The lower end of the dogs 110 extends through openings 116 in the flange F of the coaming. The lower end of the dogs 110 is provided with shoulders 117 which bear against the lower surface of the flange F when the bolt 115 is tightened upon the dog pad 112. The dog 110 is adapted to pivot in the opening 116 sufficiently to clear the dog pad 112 when the bolt 115 has been loosened and the dog is to be removed prior to opening of the hatch cover.

To maintain the hatch cover in the proper position and guide the hatch cover in its travel, depending guide plates 118 are tacked onto the hatch cover to extend downwardly below the top surface of the coaming C slightly inwardly therefrom when the hatch cover is being opened or closed. By contact between the guide plates and the coaming, the hatch cover is guided along a straight line path to prevent binding of the cover.

Figure 14:
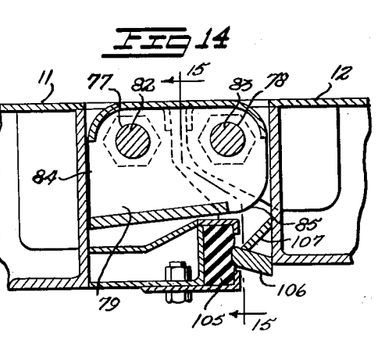
Fig. 14 is a sectional view along the line 14—14 of Fig. 1.
Figure 15:
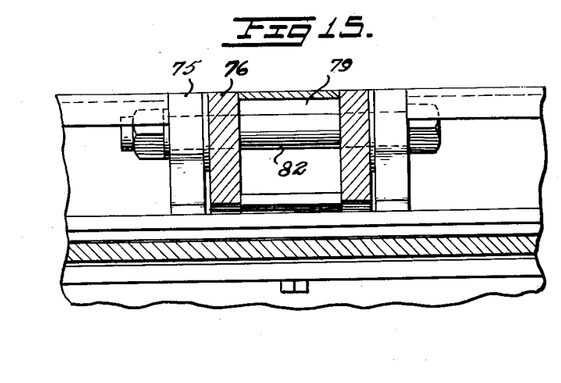
Fig. 15 is a sectional view along the line 15—15 of Fig. 14.

The intermediate link-type hinges 22 and 23 are different from those described heretofore and are best illustrated in Figs. 14 and 15. Each panel 11 and 12 is provided with a pair of spaced pads 75, 76 at their adjacent edges. Each pair of pads 75, 76 has aligned holes 77, 78 drilled therethrough. A link 79 is provided between the pads 75, 76. Holes are drilled through the links in such a position as to be aligned with holes 77, 78 and a bolt 82 extends through the holes 77 in pads 75 and the holes in link 79. A similar bolt 83 extends through the holes 78 in pads 76 and the holes in link 79. The link 79 is arranged with a vertical bearing surface 84 at one side thereof which abuts against the vertical edge of the panel 11. The opposite side of the link 79 is rounded, as shown at 85, and does not contact the panel 12. The linked arrangement described permits the panels 11 and 12 to pivot upwardly about the bolts 82, 83. As the panel 12 is being lifted, the link 79 abuts against panel 11 with its vertical bearing surface 84, and is firmly held in position and strengthened thereby.

Figure 24:
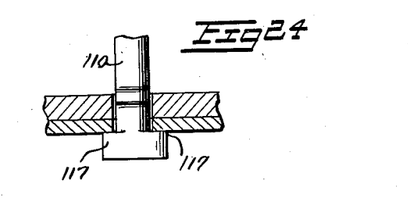
Fig. 24 is a sectional view along the line 24—24 of Fig. 22.

At the joints between panels 11 and 12 and 15 and 16 is mounted a gasket 105 extending across the width of the hatch as shown in Figs. 14 and 20. As shown in Fig. 24, the gasket 105 is mounted on panel 11 below the upper surface plate extending across the hatch below the intermediate linked hinges 22 and 23, and is adapted to be contacted by a bar 106 attached to the adjoining panel 12 when the panels are in closed position to form a seal across the joint. The bar 106 is shown to be suitably supported by a bracing member 107.

In operation, to open the four-panel section of the cover from the solid line position of Fig. 3 to the dotted line position thereof, the wheels 30 travel along the flange with the panels 14 and 15 opening about the intermediate hinges 20. Wheels 35 located on panel 15 come into contact with the flange and the cover is supported by the two sets of wheels. During the final movement of the cover, the three sets of wheels travel respectively along the flange until they are resting on the jacking platforms 40, 41, and 41'. By releasing the cable 60 after removal of the locking toggle pin 67, the jacking platforms pivot downwardly due to the weight of the cover, forming the seal.

To open the hatch cover section, shackles are attached to the lifting pads 75' and by raising the falls, the cover is buckled upwardly at the intermediate joint between panels 14 and 15. The three pairs of wheels follow the flange and the weight of the cover is supported thereby as the intermediate joint between panels 14 and 15 is lifted until wheels 33 leave the flange and the weight is supported by the two remaining sets of wheels 30 and 35. During this period of the opening of the cover, panel 15 is pivoting about bolt 83 of the link hinge 23 and the flat bearing surface 84 of the link is in engagement with the vertical edge of panel 16. The cover is next buckled upwardly at the intermediate joint between panels 16 and 17 and the cover travels on wheels 30 for the remainder of travel.

The hinges H and H' are set back from the coaming so that there is sufficient space for the four panels, now in vertical position, to be stored completely clear of the hatch opening. The constructcion of the stiffeners is such that the panels interfit to form two adjacent rectangular boxes.

The operation of the port section operates in the same manner as the starboard section just described.

It will be obvious to those skilled in the art that various changes may be made without departing from the spirit of the invention and the invention is not limited to what is shown in the drawings and described in the specification, but only as indicated in the appended claims.

What is claimed is:

1. A water-tight hatch comprising a hatch cover, said hatch cover comprising at least one section having more than one pair of wheels mounted thereon, a gasket mounted on the underside of said cover extending about the periphery thereof, a coaming upstanding from the deck, side and end flanges mounted externally of and surrounding said coaming, a weatherstrip mounted on each flange slightly outwardly from said coaming, a trackway on said side flanges located outwardly from said weatherstrip, means for simultaneously lowering said wheels from the level of said trackway to a level below said trackway to enable said weatherstrips to engage said gasket to provide a water-tight seal between said hatch cover and the hatch opening and for raising said wheels to the level of said trackway for breaking said seal, the means for simultaneously lowering and raising said wheels comprising a wheel-receiving surface for each said wheel, each said surface extending through an opening in said trackway to a position flush with said trackway when in the raised position, means connecting the wheel-receiving surfaces at each side of said hatch for simultaneously pivoting said wheel-receiving surfaces upwardly or downwardly, said wheel-receiving surfaces on one side of said hatch being each pivotally attached to a pull rod, said pull rod extending substantially the length of said hatch, and means for moving said pull rod horizontally in one direction whereby the wheel-receiving surfaces are simultaneously pivoted downwardly and in the other direction whereby the surfaces are simultaneously pivoted upwardly flush with said trackway.

2. A hatch in accordance with claim 1, wherein the end of said pull rod is attached to a pivotally mounted lever, and means for actuating said lever, whereby as said lever is moved in either direction, said lever and said pull rod cooperate to pivot said wheel-receiving surfaces simultaneously upwardly or downwardly.

3. A hatch in accordance with claim 1, including means for locking said pull rod in the position wherein said surfaces are flush with said trackway.

4. A hatch in accordance with claim 1, including means for simultaneously actuating the pull rods on each side of said hatch for lowering or raising the wheels on both sides of the hatch simultaneously.

5. In a hatch structure, a deck, a coaming, an articulated hatch cover section, said hatch cover section comprising a plurality of panels, each adjacent pair of panels of which is pivotally joined edgewise, hinge structure adopted to hinge the outer panel of said section to said deck outside the coaming, a weatherstripping encircling said hatch, a gasket mounted on the underside of said cover extending about the periphery thereof, said weatherstripping and said gasket being adapted to engage when the cover is in sealed position, more than one pair of wheels mounted on the underside of said panels, one of said pair of wheels being mounted at the outer sides of the free end of the inner panel, and another pair of wheels being mounted on the outer sides of the outer end of the panel that is pivotally joined to the inner panel, a trackway at each side of said hatch, means for simultaneously lowering portions of said trackway adjacent the location of said wheels when in the closed position from the level of said trackway to a level below said trackway to enable said weatherstripping to engage said gasket to provide a water-tight seal between said hatch cover and the hatch opening and for raising said wheels to the level of said trackway for breaking said seal, the portions of said trackway being each pivotally attached to a pull rod, said pull rod extending substantially the length of said hatch, and means for moving said pull rod horizontally whereby the wheel-receiving portions of said trackway are simultaneously pivoted upwardly or downwardly.

6. In a hatch structure, a deck, a coaming, an articulated hatch cover, said hatch cover comprising two sections, each of said hatch cover sections having a plurality of panels, each adjacent pair of panels of which is pivotally joined edgewise, hinge structures adapted to hinge the outer panel of said sections to said deck outside the coaming, more than one pair of wheels mounted on the underside of each of said sections, one of said pair of wheels being mounted at the outer sides of the free end of each inner panel, and another pair of wheels being mounted on the outer sides of the outer end of each of the panels that is pivotally joined to the inner panel, the wheels mounted at the free ends of the inner panels traveling on the same side of the hatch being mounted in different vertical planes, one being mounted inwardly of the other, said wheels being so mounted that in the closed position of the cover said wheels overlap one another, the wheel mounted on the free end of the inner panel of one section and the wheel mounted on the outer end of the panel that is pivotally joined to said inner panel travelling on the same side of the hatch being mounted in different vertical planes, one being mounted inwardly of the other, a trackway at each side of said hatch, said trackway being sufficiently wide to accommodate simultaneously side-by-side two of said wheels, whereby as the section is moved from a closed horizontal position covering the hatch to an open vertical position adjacent to the hatch there is no interference between the wheels, means for simultaneously lowering said wheels from the level of said trackway to a level below said trackway to enable said hatch cover to seal said hatch opening and for raising said wheels to the level of said trackway for breaking said seal, said means comprising a wheel-receiving surface for each said wheel, each said surface extending through an opening in said trackway to a position flush with said trackway when in the raised position, a pull rod extending substantially the length of said hatch, said pull rod being pivotally attached to each said wheel-receiving surface, and means for moving said pull rod horizontally, whereby the wheel-receiving surfaces are simultaneously pivoted upwardly or downwardly.

7. In a hatch structure, a deck, a coaming, a trackway at each side of said hatch, a plurality of openings through said trackways, a plurality of wheel-receiving surfaces, each wheel-receiving surface being adapted to fit into one of said openings flush with said trackway, a pull rod extending substantially the length of said hatch, said pull rod being pivotally attached to each said wheel-receiving surface, and means for moving said pull rod horizontally in one direction whereby the wheel-receiving surfaces are simultaneously pivoted downwardly and in the other direction whereby the surfaces are simultaneously pivoted upwardly flush with said trackway.

8. In a hatch structure, a deck, a coaming, a trackway at each side of said hatch, a plurality of openings through said trackway, a plurality of wheel-receiving surfaces, each wheel-receiving surface being adapted to fit into one of said openings flush with said trackway, a bracket extending downwardly from said trackway adjacent to each said opening, said wheel-receiving surfaces being pivotally attached to said brackets, a pull rod extending substantially the length of said hatch, said pull rod being pivotally attached to each said wheel-receiving surface, and means for moving said pull rod horizontally in one direction whereby said wheel-receiving surfaces are pivoted downwardly about said brackets and in the other direction whereby the surfaces are simultaneously pivoted upwardly flush with said trackway.

References Cited in the file of this patent

UNITED STATES PATENTS

| 1,158,946 | McGray | Nov. 2, 1915 |
|---|---|---|
| 2,194,012 | Dawson et al. | Mar. 19, 1940 |
| 2,256,087 | Hay | Sept. 16, 1941 |
| 2,656,810 | Jernstrom | Oct. 27, 1953 |
| 2,697,998 | Jernstrom | Dec. 28, 1954 |
| 2,707,928 | Farrell | May 10, 1955 |

FOREIGN PATENTS

| 158,323 | Great Britain | Jan. 31, 1921 |
|---|---|---|
| 836,608 | Germany | Apr. 15, 1952 |
| 1,022,796 | France | Dec. 17, 1952 |